(12) United States Patent
Kim et al.

(10) Patent No.: US 12,350,634 B2
(45) Date of Patent: Jul. 8, 2025

(54) MAGNETIC MIXER AND MAGNETIC MIXING SYSTEM

(71) Applicant: SEDNA ENG CO., LTD., Siheung-si (KR)

(72) Inventors: Hyuck Bae Kim, Siheung-si (KR); Jong In Kim, Siheung-si (KR)

(73) Assignee: SEDNA ENG CO., LTD., Siheung-si (KR)

( * ) Notice: Subject to any disclaimer, the term of this patent is extended or adjusted under 35 U.S.C. 154(b) by 550 days.

(21) Appl. No.: 17/960,117

(22) Filed: Oct. 4, 2022

(65) Prior Publication Data

US 2024/0091725 A1   Mar. 21, 2024

(30) Foreign Application Priority Data

Sep. 21, 2022   (KR) .................. 10-2022-0119080

(51) Int. Cl.
| | |
|---|---|
| *B01F 33/00* | (2022.01) |
| *B01F 33/453* | (2022.01) |
| *B01F 35/32* | (2022.01) |
| *B01F 35/513* | (2022.01) |
| *H02K 1/27* | (2022.01) |
| *H02K 7/14* | (2006.01) |
| *B01F 35/30* | (2022.01) |
| *B01F 101/44* | (2022.01) |

(52) U.S. Cl.
CPC ...... *B01F 33/4533* (2022.01); *B01F 35/3204* (2022.01); *B01F 35/513* (2022.01); *H02K 1/27* (2013.01); *H02K 7/14* (2013.01); *B01F 2035/352* (2022.01); *B01F 2101/44* (2022.01)

(58) Field of Classification Search
CPC ......................... B01F 33/4533; B01F 35/513; B01F 35/3204; B01F 2035/352; B01F 2101/44; H02K 1/27; H02K 7/14
See application file for complete search history.

(56) References Cited

U.S. PATENT DOCUMENTS

| | | | |
|---|---|---|---|
| 2014/0349385 A1* | 11/2014 | Erdenberger | B01F 35/4122 435/302.1 |
| 2020/0179885 A1* | 6/2020 | Sevenants | B01F 35/513 |
| 2022/0023810 A1* | 1/2022 | Føns | B01F 33/4535 |

FOREIGN PATENT DOCUMENTS

| | | |
|---|---|---|
| KR | 10-2008-0103045 A | 11/2008 |
| KR | 20-0458696 Y1 | 3/2012 |
| KR | 10-2013-0039751 A | 4/2013 |
| KR | 10-1249717 B1 | 4/2013 |
| KR | 10-2021-0033223 A | 3/2021 |
| KR | 10-2022-0010716 A | 1/2022 |
| KR | 10-2416207 B1 | 7/2022 |

* cited by examiner

*Primary Examiner* — Anshu Bhatia
(74) *Attorney, Agent, or Firm* — Park, Kim & Suh, LLC

(57) ABSTRACT

The present invention relates to a magnetic mixer to which a disposable resin liquid pouch is applied instead of a metal tank, for accommodating and mixing liquids therein, to minimize cross-contamination of liquids to be mixed due to an unwashed residue, increase a magnetic coupling force between rotors for driving an impeller inside the liquid pouch and an impeller outside the liquid pouch by a magnetic coupling method, and prevent separation of the impeller in liquids to be mixed, and a magnetic mixing system.

13 Claims, 7 Drawing Sheets

MAGNETIC MIXER AND MAGNETIC MIXING SYSTEM

CROSS-REFERENCE TO RELATED APPLICATIONS

This application claims priority under 35 U.S.C. § 119 to Korean Patent Application No. 10-2022-0119080 filed on Sep. 21, 2022, in the Korean Intellectual Property Office, the disclosures of which are incorporated by reference herein in their entireties.

BACKGROUND OF THE INVENTION

Field of the Invention

The present invention relates to a magnetic mixer and a magnetic mixing system. More specifically, the present invention relates to a magnetic mixer to which a disposable resin liquid pouch is applied instead of a metal tank, for accommodating and mixing liquids therein, to minimize cross-contamination of liquids to be mixed due to an unwashed residue, increase a magnetic coupling force between rotors for driving an impeller inside the liquid pouch and an impeller outside the liquid pouch by a magnetic coupling method, and prevent separation of the impeller in liquids to be mixed, and a magnetic mixing system.

Background Art

In general, a mixing system is configured by mounting a mixer in a metal tank containing liquids to be mixed, and the mixer may mix liquids by driving a rotor, which is driven basically by a driving motor, outside the tank and providing a metal impeller in the tank to rotate the impeller in the liquids during the rotation of the rotor.

Such a mixer has been variously used in various industrial fields ranging from the primary industry, such as the supply of agricultural water, to pharmaceutical, biological, food fields. Recently, the demand for efficient and safe mixers available in pharmaceutical, biological, food, cosmetic, secondary battery, and chemical industry fields is continuously increasing.

Due to the recent outbreak of COVID 19 pandemic, it is necessary to shorten a vaccine development period from more than a few years to one to two years to develop and rapidly supply vaccines that can be simultaneously applied in a pharmaceutical field all over the world. To this end, multi-track vaccine development has been attempted to simultaneously develop vaccines that are likely to be approved.

As described above, as a vaccine development process is shortened, initial investment costs for supporting multi-track development are high and washing/sterilization equipment is required, but a mixing system based on liquid pouch formed of a disposable polymer material and contributing to low initial investment costs may be more suitable than a mixing system (bioreactor) based on a tank formed of a stainless steel that can be used for a long period.

In the case of a general mixing system of the related art, the mixing system cannot be operated during washing or sterilizing of a tank thereof, thus reducing production efficiency, and cross-contamination (when a next product is contaminated by an unwashed residue of an existing product) may occur due to a failure of a washing and disinfection process.

However, the liquid pouch of the mixing system based on the liquid pouch formed of the disposable polymer material is used only once and discarded after use to avoid a risk of cross-contamination, and a process or equipment for washing/sterilization is not necessary, thus increasing efficiency.

Similar to the mixing system of the related art to which a general metal tank is applied, a magnetic mixer may be applied to a disposable mixing system to prevent mixing of foreign substances, and a method of separating the inside and outside of a tank from each other may be considered.

An impeller of a magnetic mixer applied to a disposable mixing system of the related art is configured to be flat, and a direction in which permanent magnets of the magnetic mixer and permanent magnets of a rotor are magnetically coupled to each other is generally in parallel with an axial direction. Thus, the impeller is likely to be separated during rotation at a high speed. When joining of the impeller and a liquid pouch formed of a disposable material is taken into account, a degree of magnetic coupling between the permanent magnets of the rotor may be decreased relatively due to an interaction between the permanent magnets of the impeller when the impeller is also formed of a resin material, thus making it difficult to deliver a sufficient driving force and causing separation of the impeller in a mixing process.

Although a method of increasing an area of the impeller and the number of magnets may be considered to solve a reduction of the magnetic coupling force, an area of an opening for installation of a structure for supporting the impeller in the disposable liquid pouch and a bonding area for bonding the structure may increase, thus increasing the number of electromagnets to be included in the rotor and the size and weight of the rotor.

SUMMARY OF THE INVENTION

The present invention is directed to providing a magnetic mixer to which a disposable resin liquid pouch is applied instead of a metal tank, for accommodating and mixing liquids therein, to minimize cross-contamination of liquids to be mixed due to an unwashed residue, increase a magnetic coupling force between rotors for driving an impeller inside the liquid pouch and an impeller outside the liquid pouch by a magnetic coupling method, and prevent the separation of the impeller in liquids to be mixed, and a magnetic mixing system.

To achieve these objects, the present invention provides a magnetic mixer mounted in a liquid pouch in which flexible resin liquids to be mixed are contained, the magnetic mixer comprising: a driving motor; a rotor configured to be rotatably driven by the driving motor and comprising a plurality of permanent magnets in a circumferential direction; a housing surrounding the rotor and a rotation shaft of the rotor and having a lower end mounted on a side of the driving motor; a bonding plate comprising a driving part formed of a resin material, having an inner driving space for accommodating the rotor to be rotatable, and disposed inside the liquid pouch while passing through the liquid pouch, and a bonding part bonded around an opening formed in the liquid pouch and on an upper end of the housing; and an impeller formed of a resin material, mounted in the liquid pouch to be rotatable by the driving part of the bonding plate, and having a main body configured to be rotated by the rotation of the rotor, the main part including a plurality of blades on an outer circumferential surface thereof in the circumferential direction and a plurality of embedded permanent magnets in the circumferential direction.

And a pipe type bearing mounting part may be provided on the driving part of the bonding plate, at least one bearing may be mounted around the bearing mounting part, and an inner circumferential surface of the impeller may be supported and mounted on an outer circumferential surface of the at least one bearing.

And a step may be provided at a boundary between the driving part and the bearing mounting part of the bonding plate, and an upper end of the bearing mounting part may comprise a hook protruding outward to prevent separation of the at least one bearing.

And an inwardly bent stopper may be provided on the main body of the impeller to prevent separation of the at least one bearing.

And the main body of the impeller may be finished with a ring-shaped finishing plate after the plurality of permanent magnets are inserted into a lower surface of the main body.

And the bonding part of the bonding plate may have two-stage steps on a lower surface thereof, and an outer side thereof may be bonded on an inner circumferential surface of the opening in the liquid pouch, and an inner side thereof is bonded with an upper flange of an upper end of the housing while passing through the opening.

And an outer end of the lower surface of the bonding part of the bonding plate may be thermally fused around the inner circumferential surface of the opening in the liquid pouch.

And a body part of the impeller and the permanent magnets of the rotor may be spaced apart from each other in the circumferential direction to alternately change polarities of the permanent magnets for mutual magnetic coupling.

And the magnetic mixer may further comprise a magnetic force enhancing member formed of a high permeable magnetic material and disposed between the permanent magnets of the body part of the impeller.

And the magnetic force enhancing member may be formed of a high nickel alloy material and has a height and thickness corresponding to those of each of the permanent magnets.

And to achieve these objects, the present invention provides a magnetic mixing system comprising: a liquid pouch formed of a flexible resin material; the magnetic mixer discussed above, the magnetic mixer being installed through an opening formed in the liquid pouch; and a container configured to accommodates the liquid pouch while covering side surfaces and a bottom surface of the liquid pouch, the container being mounted to expose the magnetic mixer.

And the container may have a slit type opening formed to be long in a vertical direction to allow a water level of liquids contained in the liquid pouch to be observed.

And at least one liquid injection hole may be provided in an upper portion of the liquid pouch, and at least one liquid discharge hole may be provided in a lower portion of the liquid pouch.

And an outer end of a lower surface of the bonding part of the bonding plate may be thermally fused around an inner circumferential surface of the opening in the liquid pouch.

And the liquid pouch may be formed of a multi-layer polyethylene (PE) film, the bonding plate may be formed of a high-density polyethylene (HDPE) material, and thermal fusion temperature is in a range of 170° C. to 200° C.

DETAILED DESCRIPTION

Hereinafter, embodiments of the present invention will be described in detail with reference to the accompanying drawings. The present invention is, however, not limited thereto and may be embodied in many different forms. Rather, the embodiments set forth herein are provided so that the present invention will be thorough and complete, and fully convey the scope of the invention to those of ordinary skill in the art. Throughout the specification, the same reference numbers represent the same elements.

Figure 1:
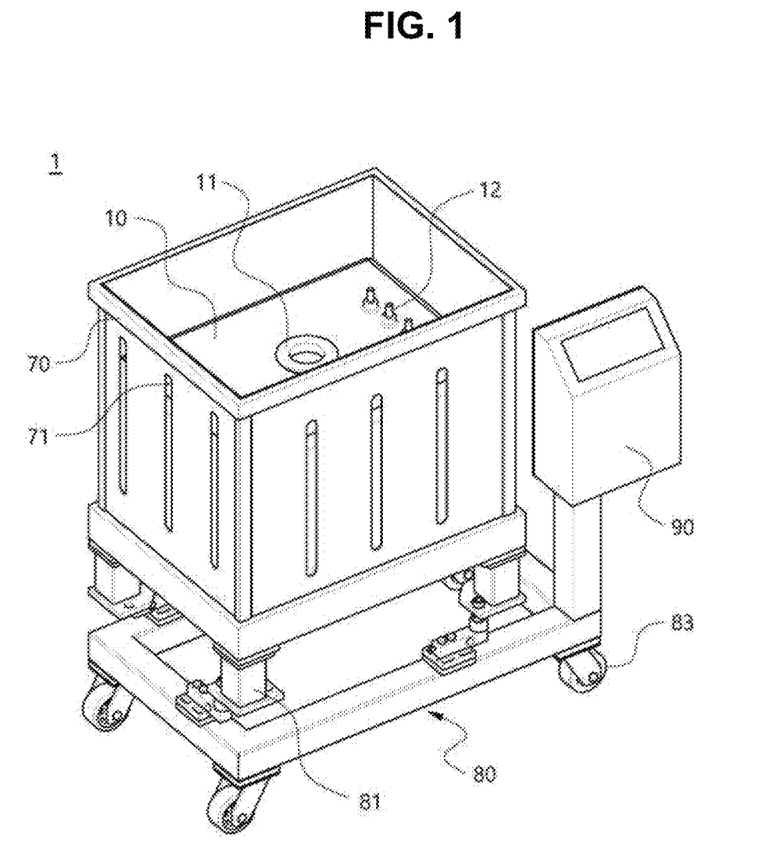
FIG. 1 illustrates a perspective view of a magnetic system according to the present invention.
Figure 2:
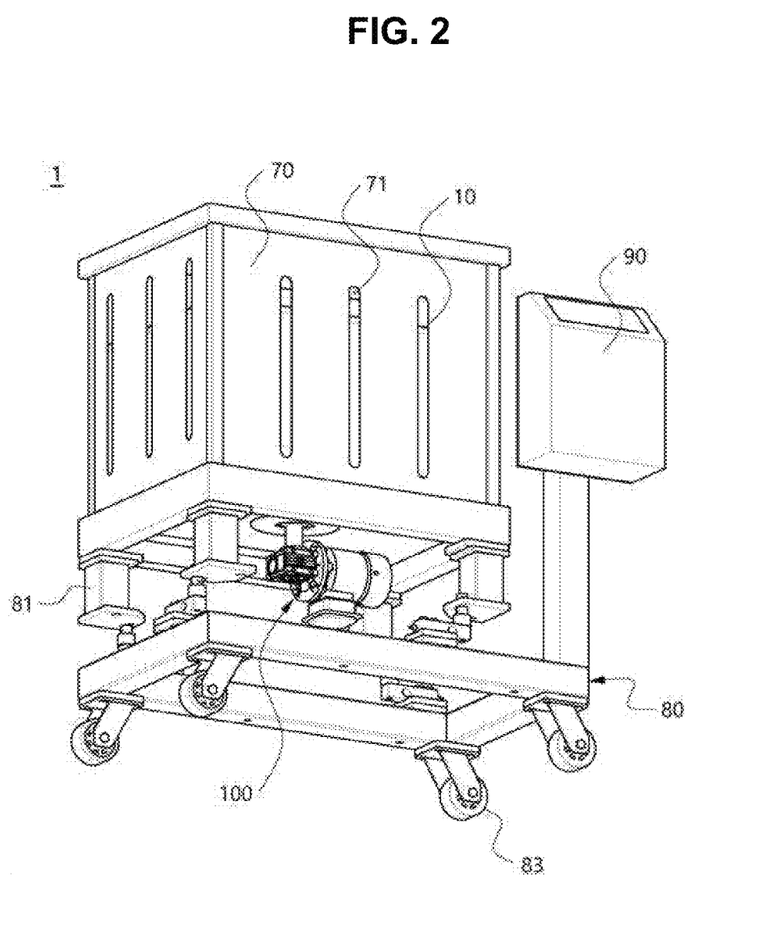
FIG. 2 is a bottom perspective view of the magnetic system of FIG. 1.

FIG. 1 is a perspective view of a magnetic mixing system 1 according to the present invention. FIG. 2 is a bottom perspective view of the magnetic mixing system 1 of FIG. 1.

The magnetic mixing system 1 according to the present invention may include a liquid pouch 10 formed of a flexible resin material, a magnetic mixer 1000 mounted in the liquid pouch 10, and a container 70 accommodating the liquid pouch 10 while covering side surfaces and a bottom surface of the liquid pouch 10 and mounted to expose the magnetic mixer 1000 through a lower portion thereof.

The magnetic mixing system 1 according to the present invention includes the liquid pouch 10 formed of a flexible material and configured to accurately mix liquids by the magnetic mixer 1000 in a pharmaceutical or biological field, instead of a metal tank for accommodation of liquids to be mixed.

Therefore, when the mixing of the liquids is completed or when the liquids to be mixed are changed, the liquid pouch 10 may be replaced with new one without being washed to fundamentally avoid a residue of foreign substances or a possibility of cross-contamination.

In order to form the liquid pouch 10 in a disposable or replaceable form, the liquid pouch 10 may be formed of a flexible resin material, and may be formed of a material such as a multi-layer polyethylene (PE) film to significantly reduce costs and prevent the liquid pouch 10 from tearing due to an external stimulus.

Polyethylene (PE) withstands a strong oxidant, an acid-base, and the corrosion and dissolution of an organic solvent due to excellent chemical resistance and thus is not easily deformed or corroded, and is suitable as a material of a pouch for accommodating liquids to be mixed due to water resistance.

In addition, the container 70 configured to accommodate a flexible pouch into which liquids are injected while covering side and lower surfaces of the pouch to support the pouch may be installed such that the magnetic mixer 1000 is exposed through a lower portion of the container 70.

The container 70 may support the liquid pouch 10, which cannot stand by itself due to liquids injected therein, to mix the injected liquids.

The container 70 may include a slit type opening 71, which extends to be long in a vertical direction and through which a water level of the liquids contained in the liquid pouch 10 may be observed. A position of the water level of the liquids in the liquid pouch 10 that is in a semi-transparent state may be checked through the opening 71.

In addition, the magnetic mixer 1000 may be mounted below the container 70. As will be described below, the impeller 200 of the magnetic mixer 1000 and a bonding plate 600 (see FIG. 4) may be mounted inside the liquid pouch 10, and a rotor 500 of the magnetic mixer 1000 may be disposed in an inner space of a driving part 620 of the bonding plate 600 bonded onto the liquid pouch 10 to completely separate the inside and outside of the liquid pouch 10 from each other and cause the impeller 200 to be rotated during the rotation of the rotor 500.

A driving motor 800, a reducer 700, etc. of the magnetic mixer 1000 may be mounted to be fixed or supported on the container 70 or a frame around the container 70, the container 70 may be mounted on a transfer frame 80, which includes a roller 83, through a leveling unit 81 to reduce vibration or maintain level, and a controller 90 for control of the magnetic mixer 1000 may be provided on the transfer frame 80.

Accordingly, in the magnetic mixing system 1 described above, after the mixing of the liquids injected into the liquid pouch 10 is completed, a result of mixing the liquids may be discharged, the liquid pouch 10 may be replaced with new one, and new liquids may be injected and mixed in the new liquid pouch 10.

In this case, the bonding plate 600 bonded inside the liquid pouch 10 and the impeller 200 mounted outside the bonding plate 600 may be replaced with new ones.

The impeller 200 and the bonding plate 600 are also configured for one-time use and thus may be formed of a non-metal resin material or the like in consideration of costs and the like.

Hereinafter, the magnetic mixer 1000 mounted in the liquid pouch 10 according to the present invention will be described below.

Figure 3:
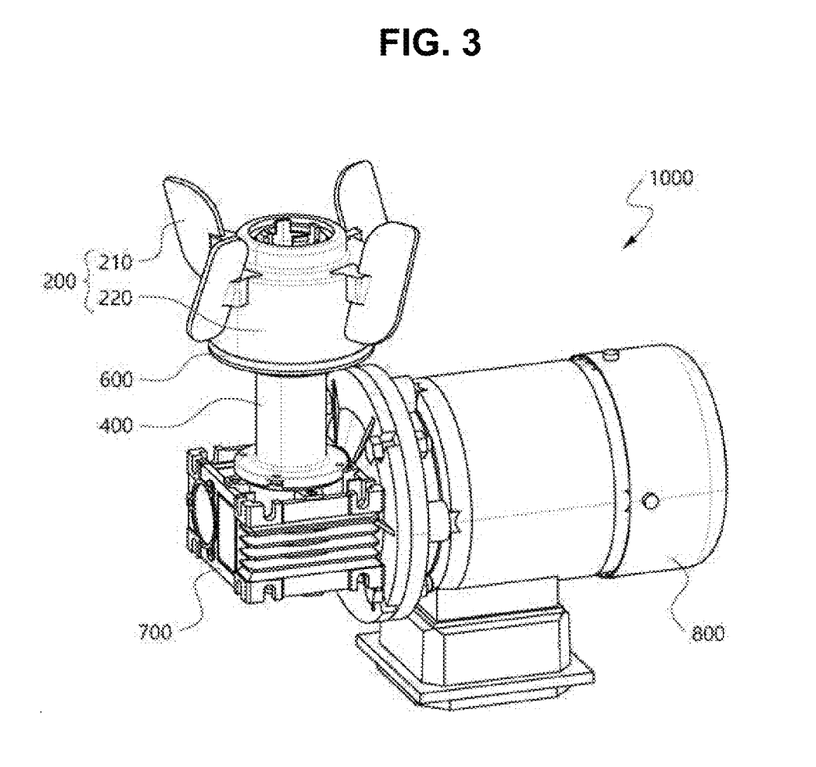
FIG. 3 illustrates a magnetic mixer applied to the magnetic system of FIG. 1.
Figure 4:
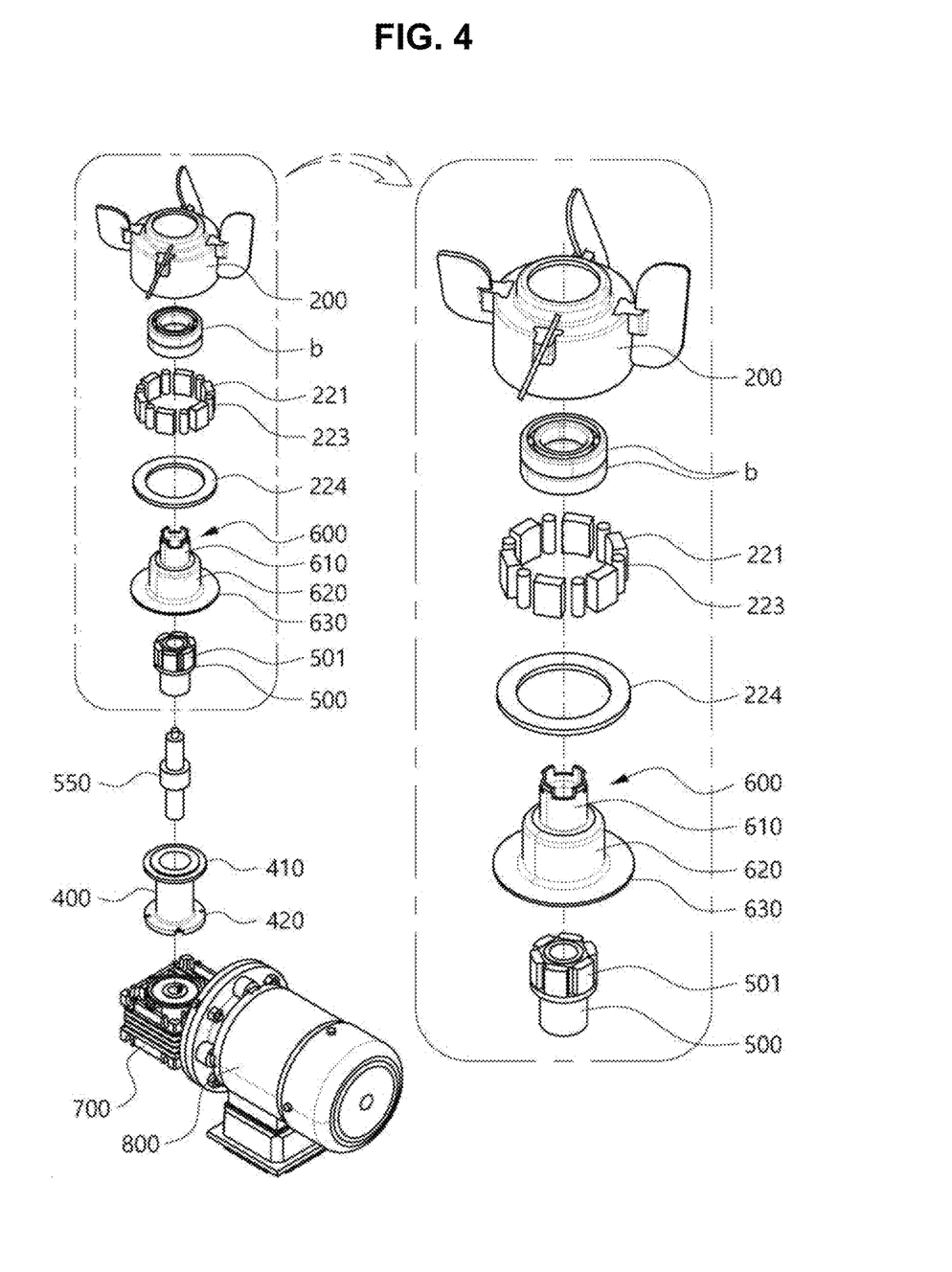
FIG. 4 is an exploded perspective view of the magnetic mixer of FIG. 3.

FIG. 3 illustrates the magnetic mixer 1000 applied to the magnetic mixing system 1 of FIG. 1. FIG. 4 is an exploded perspective view of the magnetic mixer 1000 of FIG. 3.

As shown in FIGS. 3 and 4, the magnetic mixer 1000 according to the present invention may include the driving motor 800, the reducer 700, a housing 400, the rotor 500, the bonding plate 600, and an impeller 200.

Specifically, the magnetic mixer 1000 of the present invention may include the driving motor 800 formed of a flexible resin material and mounted in the liquid pouch 10 containing liquids to be mixed; the rotor 500 configured to be rotatably driven by the driving motor 800 and including a plurality of permanent magnets arranged in a circumferential direction; the housing 400 covering a rotation shaft 550 of the rotor 500 and the rotor 500 and having a lower end mounted on a side of the driving motor 800; the bonding plate 600 including the driving part 620 formed of a resin material, having an inner driving space in which the rotor 500 is disposed to be rotatable, and disposed in the liquid pouch 10 while passing through the liquid pouch 10, and a bonding part 630 bonded on an opening 13 formed in the liquid pouch 10 and the housing 400; and the impeller 200 formed of a resin material, mounted in the liquid pouch 10 to be rotated by the driving part 620 of the bonding plate 600, and including a main body 220 with a plurality of blades 210 and a plurality of embedded permanent magnets arranged in a circumferential direction and configured to be rotated by the rotation of the rotatably drive 500.

The impeller 200 directly mix liquids in the liquid pouch 10, and to this end, the impeller 200 may include a plurality of blades 210 and a plurality of permanent magnets (not shown) arranged in the main body of the impeller 200 in the circumferential direction such that an N pole and an S pole are alternately and repeatedly provided in the circumferential direction.

Here, the plurality of permanent magnets may be rotated by the rotation of the rotor 500 as an attractive force is applied between the plurality of permanent magnets and the plurality of permanent magnets of the rotor 500 to be described below. Similarly, the plurality of permanent magnets of the rotor 500 may also be embedded in the main body of the rotor 500.

The impeller 200 may include the main body 220 on which a permanent magnet is mounted and the blades 210 arranged on an outer circumferential surface of the main body 220, and the main body 220 and the blades 210 of the impeller 200 may be configured separately from each other and the blades 210 may be detachably mounted on the main body 220.

Meanwhile, the impeller 200 is brought into direct contact with liquids to be mixed in a precise liquid mixing process in a pharmaceutical or biological field and thus should be formed of a material having strong heat resistance, oxidation resistance, and corrosion resistance to not affect the components and quality of the liquids.

The main body 220 and the blades 210 of the impeller 200 may be formed of a high-density polyethylene (HDPE) material. High-density polyethylene (HDPE) is a material that withstands a strong oxidant, an acid-base, and corrosion and dissolution of an organic solvent due to excellent chemical resistance, has a specific gravity of 0.94 to 0.96, and has semi-transparent crystallizability, rigidity, impact resistance, and cold resistance, and does not deteriorate in various types of liquids to be mixed or is not easily broken when driven rotatably.

As the impeller 200 rotates, the blades 210 of the impeller 200 form a vortex inside the liquid pouch 10 to continuously float a mixture of liquids precipitated at the bottom of the liquid pouch 10, thereby continuously mixing liquids in the liquid pouch 10. As a result, the liquids to be mixed in the liquid pouch 10 can be uniformly mixed to a great extent.

The driving motor 800 generates a driving force, and a general DC driving motor, an AC driving motor, a single-phase driving motor, a 3-phase driving motor, etc. can be used as the driving motor 800 as long as they are capable of receiving electric current and generating power from the electric current.

The reducer 700 may be mounted on the driving motor 800 to change a direction of a rotation shaft and reduce a speed, and the rotor 500 may be mounted on an upper end of the rotation shaft 550 of the rotor 500 mounted on the reducer 700. Accordingly, the rotor 500 may be rotatably driven during the rotation of the driving motor 800.

The rotation shaft 550 connecting the reducer 700 and the rotor 500 may be accommodated in the housing 400, and an upper flange 410 of the housing 400 may be bonded on the bonding part 630 of the bonding plate 600 so that the rotation shaft 310 may pass through the inside of the housing 400.

A lower flange 430 of the housing 400 may be fastened to the reducer 700 (a housing of a driving motor when the reducer 700 is omitted), and the upper flange 410 of the housing 400 may be bonded on the bonding plate 600 to block an exposure of the rotation shaft 550.

The rotor 500 transmits a driving force of the driving motor 800 to the impeller 200, and to this end, the rotor 500 is coupled to the rotation shaft 550 to be rotated together with the rotation shaft 550. The plurality of permanent magnets in the rotor 500 correspond to the plurality of permanent magnets in the impeller 200.

The bonding plate 600 may be mounted on an upper end, i.e., the upper flange 410, of the housing 400. The bonding plate 600 may be mounted in the liquid pouch 10 in a bonding manner and provide a mounting space in which the impeller 200 is mounted.

The bonding plate 600 is mounted while passing through the liquid pouch 10. The bonding plate 600 may be bonded on the liquid pouch 10 and the housing 400 to physically separate the inside and outside of the liquid pouch 10 from each other.

The bonding plate 600 may include the driving part 620 formed of a resin material, having an inner driving space in which the rotor 500 is rotatably disposed, and disposed inside the liquid pouch 10 while passing through the liquid pouch 10, and the bonding part 630 bonded on the opening 13 in the liquid pouch 10 and the housing 400.

A pipe-shaped bearing mounting part 610 may be provided on the driving part 620 of the bonding plate 600, at least one bearing b may be mounted around the bearing mounting part 610, and an inner circumferential surface of the impeller 200 may be supported and mounted on an outer circumferential surface of the at least one bearing b.

Although FIG. 4 illustrates that two bearings b are mounted on the bearing mounting part 610, a length of each of the two bearings b may be increased or decreased.

Specifically, the bonding plate 600 may include the driving part 620 formed of a resin material, having an inner driving space in which the rotor 500 is rotatably disposed, and disposed inside the liquid pouch 10 while passing through the liquid pouch 10, and the bonding part 630 bonded on the opening 13 in the liquid pouch 10 and the housing 400.

Because the liquid pouch 10 may be formed of a material such as a multi-layer PE film and the bonding plate 600 having the impeller 200 mounted thereon may be formed of a high-density polyethylene material for the same reason as the impeller 200, and an outer end 633 of a lower surface of the bonding part 630 of the bonding plate 600 may be bonded on the inner circumferential surface of the opening 13 in the liquid pouch 10 by a thermal fusion method without adhering the liquid pouch 10 and the bonding plate 600 to each other via an adhesive.

When the liquid pouch is formed of a multi-layer PE film and the bonding plate is formed of a high-density polyethylene (HDPE) material, thermal fusion temperature may be in a range of 170° C. to 200° C.

In the above structure, the bonding plate 600 is bonded on the liquid pouch 10 while passing through the liquid pouch 10, the upper flange 410 of the housing 400 is coupled to or fixed on the bonding part 630 of the bonding plate 600, the driving motor 800 or the reducer 700 is coupled to or fixed on the lower flange 430 of the housing 400, the rotor 500 is coupled to the rotation shaft 550 of the reducer 700, and an end of the rotor 500 is accommodated in the driving part 620 of the bonding plate 600 to be rotatably driven, thereby rotatably driving the impeller 200 by a magnetic force.

Figure 5A:
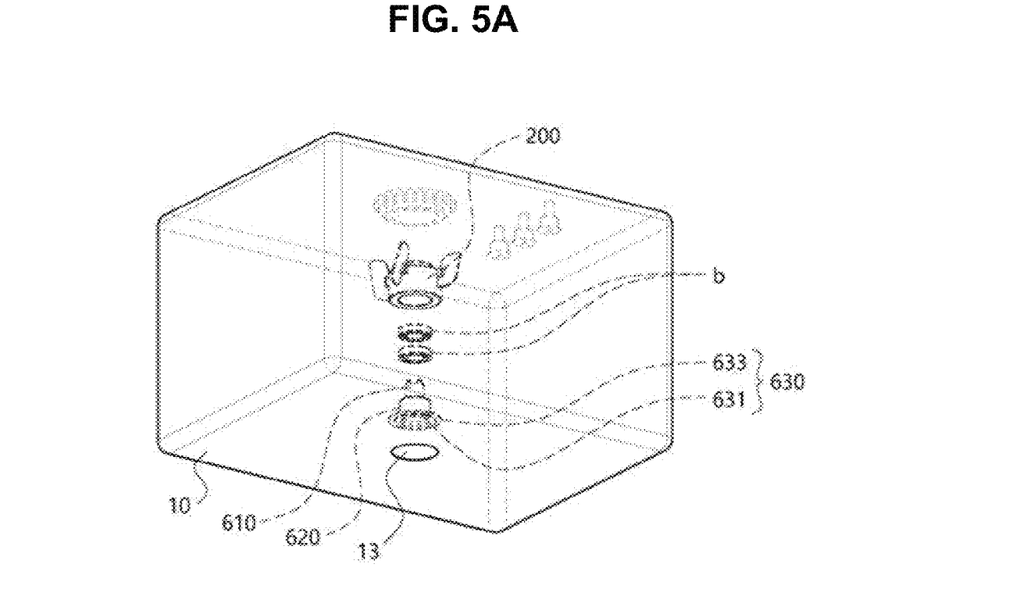
FIG. 5A and FIG. 5B illustrate a process of mounting a connection plate and an impeller in a liquid pouch constituting a magnetic system according to the present invention, and a state in which the mounting of the connection plate and the impeller is completed.
Figure 5B:
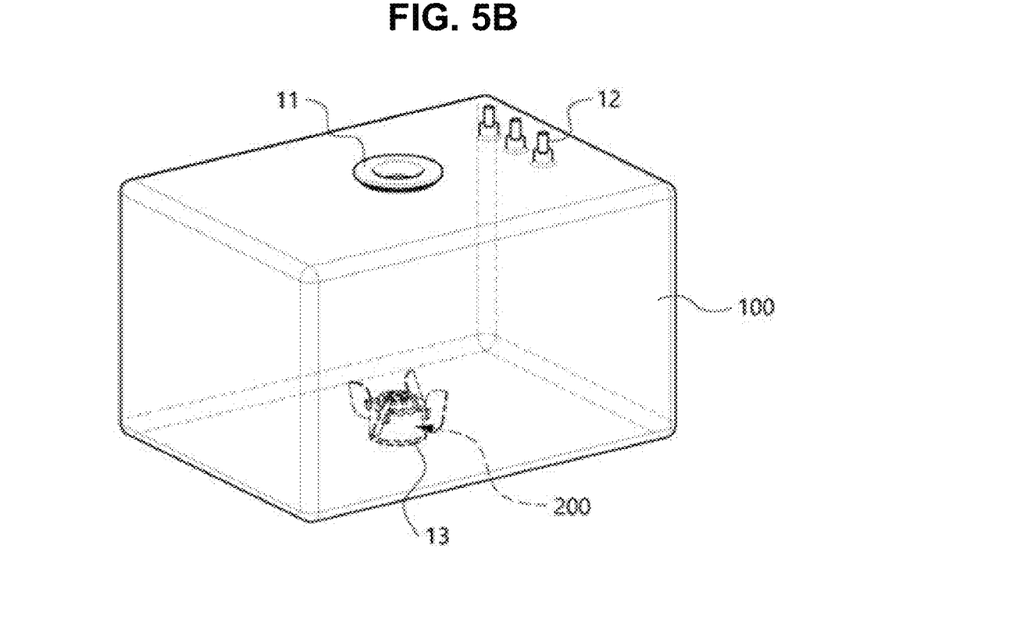

FIG. 5A and FIG. 5B illustrate a process of mounting a connection plate and an impeller in a liquid pouch constituting a magnetic system according to the present invention, and a state in which the mounting of the connection plate and the impeller is completed.

The liquid pouch 10 in which the magnetic mixer 1000 of the present invention is mounted and the impeller 200 may be configured for one-time use to reduce costs and a risk of mixing foreign substances.

As shown in FIG. 5A, in order to form the liquid pouch 10 for one-time use, the opening 13 is formed on a lower surface of the pouch 10 formed of a multi-layer PE film and the bonding part 630 of the bonding plate 600 is bonded around the opening 13.

As shown in FIG. 5A, the lower surface of the bonding part 630 of the bonding plate 600 may have a two-stage step, the outer end 633 may be bonded around the inner circumferential surface of the opening 13 in the liquid pouch 10, and an inner end 631 may be bonded with the upper flange 410 of the housing 400 while passing through the opening 13. The impeller 200, the bearing b, and the bonding plate 600 may be inserted through an opening 11 in the upper surface of the liquid pouch 10.

That is, the inner end 631 of the lower surface of the bonding part 630 of the bonding plate 600 may be bonded on or coupled to the upper flange 410 of the housing 400 while passing through the opening 13, and the outer end 633 may be bonded around the opening 13.

As described above, the outer end 633 of the lower surface of the bonding part 630 of the bonding plate 600 may be thermally fused around the inner circumferential surface of the opening 13 in the liquid pouch 10 to maintain airtightness.

When the bonding of the bonding plate 600 around the opening 13 of the liquid pouch 10 is completed, the bearing b may be mounted on the bearing mounting part 610 of the bonding plate 600 and an impeller 200 may be mounted to be supported by the mounted bearing b.

As shown in FIG. 5B, the liquid pouch 10 may be configured for one-time use by mounting a valve, a pipe or the like on each of a liquid inlet 12 and a liquid outlet 13.

A plurality of liquid inlets 12 may be provided on the upper surface of the liquid pouch 10, and the liquid outlet 13 may be provided on the lower surface or a lower portion of a side surface of the liquid pouch 10 to discharge s result of mixing liquids.

As described above, the liquid pouch 10 of the magnetic mixer 1000 according to the present invention may be formed of a flexible resin material and the impeller 200 and the bonding plate 600 may also be formed of a resin material to minimize costs.

The liquid pouch 10 may be used for one-time use but can be recycled after washing the liquid pouch 10 by injecting washing water thereinto, and the impeller 200 and the like can be recycled by separating them from the liquid pouch 10 to be discarded when needed.

In the magnetic mixing system 1 of the related art, buoyancy generated by liquids when a mixing operation is performed in the liquids by the impeller 200 formed of a metal material and thus having certain weight is neglectable, whereas the impeller 200 formed of a HDPE resin material is relatively light in weight and thus is likely to be separated from the bonding plate 600 according to the viscosity of the liquids.

Therefore, the magnetic mixer 1000 according to the present invention may provide a structure that contributes to minimizing the number of components and prevents the impeller 200 from being separated from the bonding plate 600 when driven in the liquids.

Hereinafter, a structure in which the impeller 200 and the bonding plate 600 constituting the magnetic mixer 1000 according to the present invention are mounted will be described in detail.

Figure 6A:
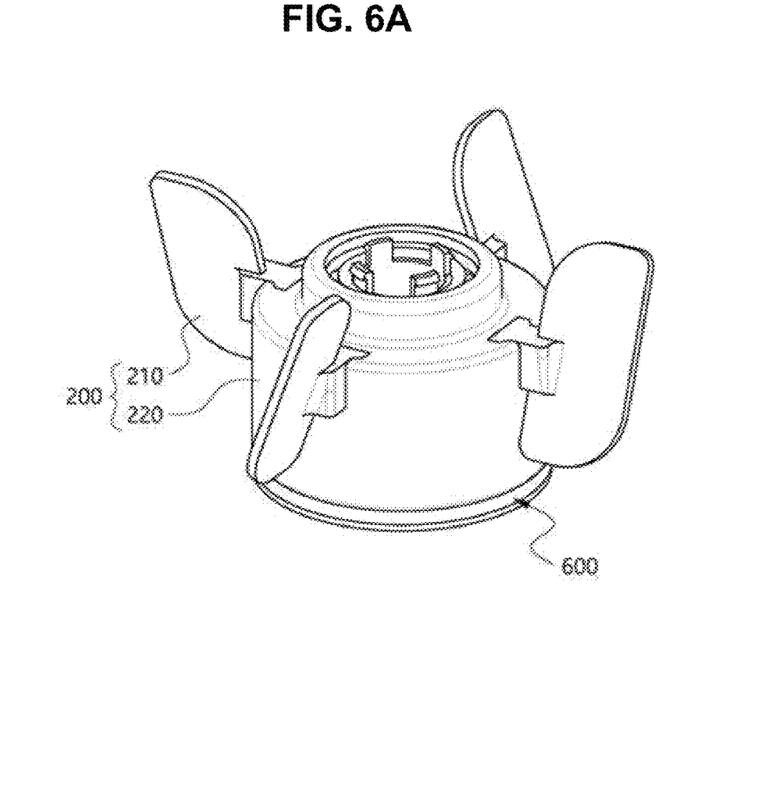
FIG. 6A and FIG. 6B are an outer perspective view and a perspective view showing the internal configuration of an impeller of a magnetic mixer 1000 according to the present invention.
Figure 6B:
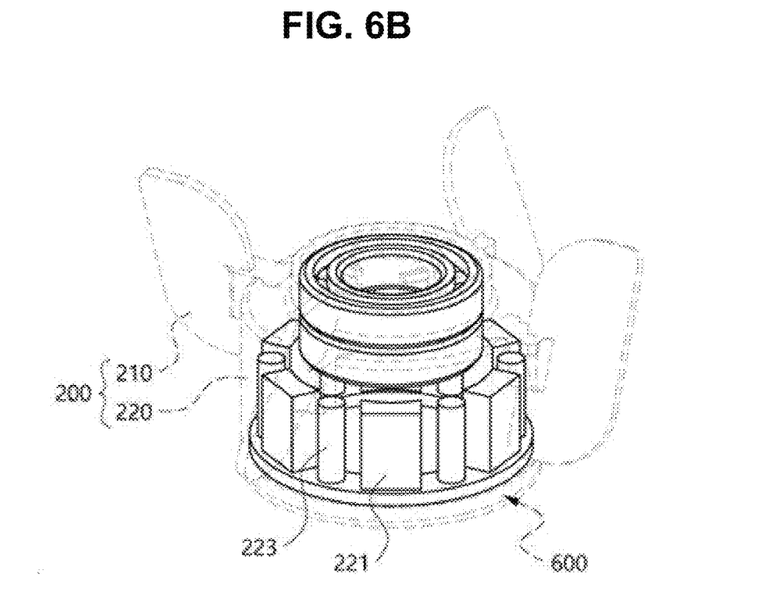
Figure 7A:
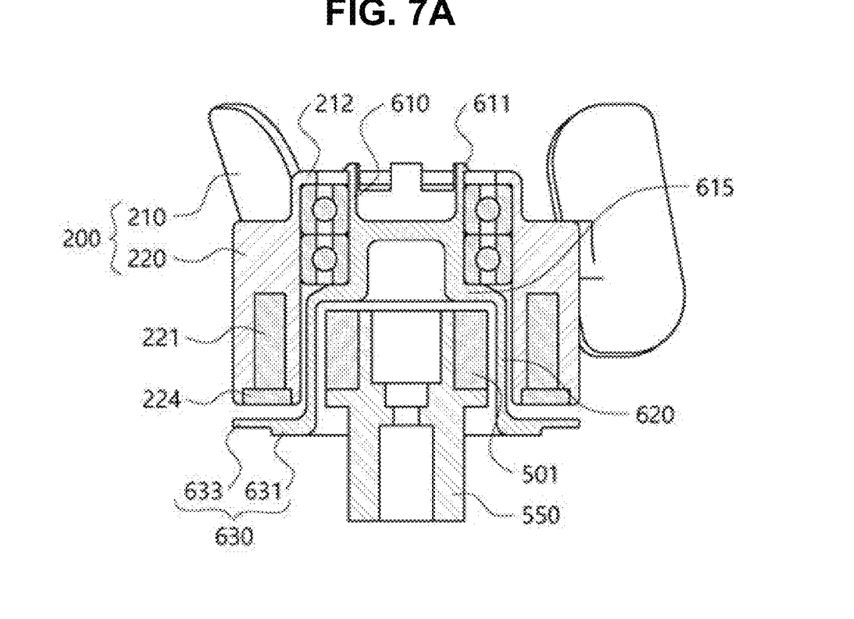
FIG. 7A and FIG. 7B are a longitudinal sectional view and a cross-sectional view of an impeller in which a rotor of a magnetic mixer is disposed according to the present invention.
Figure 7B:
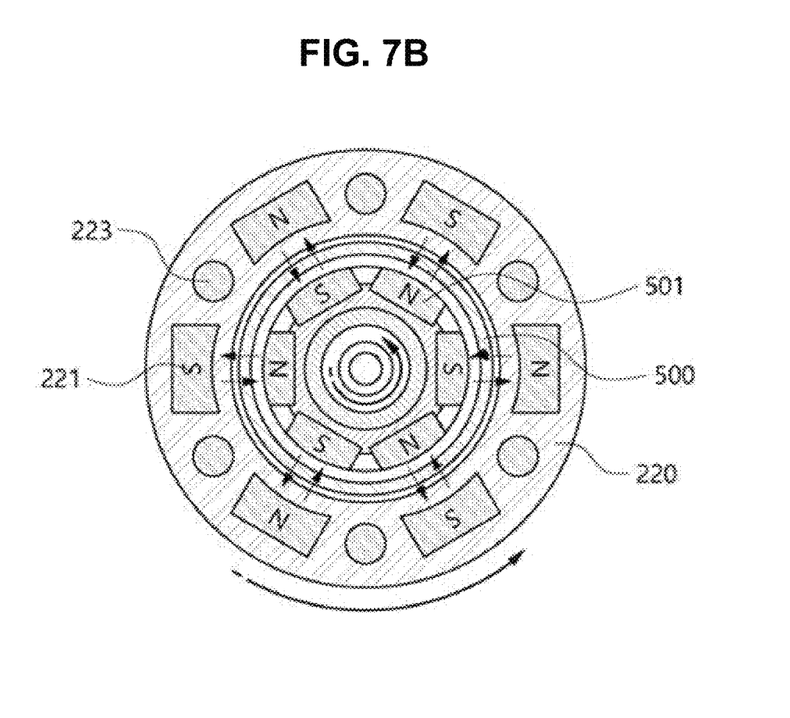

FIG. 6A and FIG. 6B are an outer perspective view and a perspective view showing the internal configuration of an impeller of a magnetic mixer 1000 according to the present invention. FIG. 7A and FIG. 7B are a longitudinal sectional view and a cross-sectional view of an impeller in which a rotor of a magnetic mixer is disposed according to the present invention.

The impeller 200 of the magnetic mixer 1000 of the present invention may be formed of a resin material, and include a main body 220 that is mounted in the liquid pouch 10 to be rotatable on the driving part 620 of the bonding plate 600, includes a plurality of blades 210 and a plurality of embedded permanent magnets arranged in a circumferential direction and thus configured to be rotated by the rotation of rotor 500.

In addition, polarities of the permanent magnets of the main body 220 of the impeller 200 and the permanent magnets of the rotor 500 may be alternately changed in the circumferential direction.

Unlike the impeller 200 when formed of a metal material, a magnetic coupling force between the impeller 200, when formed of a non-metal material, and the rotor 500 may be relatively weakened by an interaction between the permanent magnets 221 that are alternately arranged in the circumferential direction and easily connected and magnetically coupled to each other. To solve this problem, in the present invention, each of magnetic force enhancing members 223 formed of a high permeable magnetic metal material is disposed between every adjacent permanent magnets 221 of the main body 220 of the impeller 200.

Each of the magnetic force enhancing members 223 may be formed of, for example, a high nickel alloy material and be in the form of a bar having the same height and thickness as those of each of the permanent magnets 221.

The magnetic force enhancing member 223 formed of a high nickel alloy material has high permeability and thus does not allow a magnetic field to easily pass therethrough, and therefore, magnetic flux and magnetic coupling between the permanent magnets 221 of the impeller 200 and the permanent magnets 501 of the impeller 200, which are limited in magnetic flux in a lateral direction, may be enhanced.

The impeller 200 of the magnetic mixer 1000 according to the present invention may be rotated not in contact with the bonding plate 600 while being supported on the outer circumferential surface of the bearing b mounted on the bearing mounting part 610 of the bonding plate 600.

However, the impeller 200 is likely to be separated due to the light weight and viscosity of liquids during the driving of the drive motor 800 and thus as shown in FIG. 7A, a structure in which a step 615 is provided at a boundary between the driving part 620 and the bearing mounting part 610 of the bonding plate 600, the upper end of the bearing mounting part 610 is provided with a hook 611 protruding outward and thus an installation position of the bearing b is determined and limited by the step 615 and the hook 611, and similarly, a stopper 212 bended inward is provided on the main body 220 of the impeller 200 to prevent separation of the bearing b and thus even when buoyancy greater than a magnetic coupling force between the permanent magnets of the impeller 200 and the permanent magnets of the rotor 500 is generated during the rotation of the impeller 200 in liquids, the separation of the bearing b may be prevented and thus the impeller 200 mounted on the outer circumferential surface of the bearing b may be supported may be provided.

That is, the separation of the impeller 200 may be prevented due to bearing power of the bearing b mounted by press-fitting and limited in movement by the step 615 and the hook 611, as well as the magnetic coupling force between the permanent magnets 221 of the impeller 200 and the permanent magnets 501 of the rotor 500.

Unlike a disposable mixer of the related art, as shown in FIG. 7A, in the present invention, a direction of magnetic coupling between the permanent magnets 221 of the impeller 200 and the permanent magnets 501 of the rotor 500 is set to be perpendicular to an axial direction of a driving motor to increase a magnetic coupling force between the rotor 500 and the impeller 200, thereby providing a torque transmission and separation prevention function to achieve sufficient mixing performance, and therefore, cross-sectional areas of the impeller 200 and the rotor 500 need not be increased unnecessarily.

When the direction of magnetic coupling between the permanent magnets 221 of the impeller 200 and the permanent magnets 501 of the rotor 500 is perpendicular to the axial direction of the driving motor, a driving part of a bonding plate may function as a magnetically coupled axis and thus a possibility that the impeller 200 will collapse in liquids to be mixed may decrease not only when blades are formed on one layer in the embodiment of FIGS. 7A and 7B but also when the blades 210 of the impeller 200 are formed on multiple layers, thereby providing a mixing system with improved mixing performance.

As the direction of magnetic coupling between the permanent magnets 221 of the impeller 200 and the permanent magnets 501 of the rotor 500 is perpendicular to the axial direction of the driving motor, load on the bearing b in an axial direction may be canceled or minimized due to a magnetic force between the permanent magnets 221 and 501, thereby minimizing foreign substances that may be generated in the bearing b due to the weight or pressure of the bearing b in the axial direction.

As shown in FIG. 7A, the main body 220 of the impeller 200 formed of a non-metal resin material may be finished with a ring-shaped finishing plate 223 after a plurality of permanent magnets and the magnetic force enhancing member 223 are inserted into a lower surface of the main body 220 or the permanent magnets and the magnetic force enhancing member 223 may be inserted during injection molding.

The permanent magnets 221 of the impeller 200 arranged as described above may be magnetically coupled to the permanent magnets of the rotor 500 as shown in FIG. 7B in a state in which an interaction between adjacent permanent magnets 221 is minimized and thus the impeller 200 may be rotated during the rotation of the rotor 500.

According to a magnetic mixer and a magnetic mixing system of the present invention, a disposable resin liquid pouch is applied instead of a metal tank in which liquids are contained and mixed, thereby minimizing cross-contamination of the liquids due to a unwashed residue, and thus the reliability of a product in a pharmaceutical and biological field can be increased and costs can be significantly reduced because washing facility and process can be omitted and the metal tank can be replaced with the disposable resin liquid pouch.

According to the magnetic mixer and the magnetic mixing system of the present invention, a magnetic coupling force between a rotor and an impeller can be increased by setting a direction of magnetic coupling between permanent magnets of the impeller and permanent magnets of the rotor to be perpendicular to an axial direction of a driving motor, thereby providing sufficient mixing performance, and load on a bearing in the axial direction can be canceled or minimized due to a magnetic force as the direction of magnetic coupling between the permanent magnets of the impeller and the permanent magnets of the rotor is in parallel with an axial direction of the driving motor in a horizontal direction, thereby minimizing the generation of foreign substances in the bearing.

In addition, according to the magnetic mixer and the magnetic mixing system of the present invention, a hook is provided on a bonding plate bonded on a liquid pouch to prevent the separation of the bearing, thereby preventing the separation of the bearing supporting an inner circumferential surface of the impeller.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

What is claimed is:

1. A magnetic mixer for a liquid pouch in which flexible resin liquids to be mixed are contained, the magnetic mixer comprising:
    a driving motor;
    a rotor configured to be rotatably driven by the driving motor and comprising a plurality of permanent magnets in a circumferential direction;
    a housing surrounding the rotor and a rotation shaft of the rotor and having a lower end mounted on a side of the driving motor;
    a bonding plate comprising a driving part formed of a resin material, having an inner driving space for accommodating the rotor to be rotatable, and disposed inside the liquid pouch while passing through the liquid pouch, and a bonding part bonded around an opening formed in the liquid pouch and on an upper end of the housing; and
    an impeller formed of a resin material, mounted in the liquid pouch to be rotatable by the driving part of the bonding plate, and having a main body configured to be rotated by the rotation of the rotor, the main part including a plurality of blades on an outer circumferential surface thereof in the circumferential direction and a plurality of embedded permanent magnets in the circumferential direction
    wherein a pipe type bearing mounting part is provided on the driving part of the bonding plate, at least one bearing is mounted around the bearing mounting part, and an inner circumferential surface of the impeller is supported and mounted on an outer circumferential surface of the at least one bearing,
    wherein a step is provided at a boundary between the driving part and the bearing mounting part of the bonding plate, and an upper end of the bearing mounting part comprises a hook protruding outward to prevent separation of the at least one bearing.

2. The magnetic mixer of claim 1, wherein an inwardly bent stopper is provided on the main body of the impeller to prevent separation of the at least one bearing.

3. The magnetic mixer of claim 1, wherein the main body of the impeller is finished with a ring-shaped finishing plate after the plurality of permanent magnets are inserted into a lower surface of the main body.

4. The magnetic mixer of claim 1, wherein the bonding part of the bonding plate has two-stage steps on a lower surface thereof, and an outer side thereof is bonded on an inner circumferential surface of the opening in the liquid pouch, and an inner side thereof is bonded with an upper flange of an upper end of the housing while passing through the opening.

5. The magnetic mixer of claim 4, wherein an outer end of the lower surface of the bonding part of the bonding plate is thermally fused around the inner circumferential surface of the opening in the liquid pouch.

6. The magnetic mixer of claim 1, wherein a body part of the impeller and the permanent magnets of the rotor are spaced apart from each other in the circumferential direction to alternately change polarities of the permanent magnets for mutual magnetic coupling.

7. The magnetic mixer of claim 6, further comprising a magnetic force enhancing member formed of a high permeable magnetic material and disposed between the permanent magnets of the body part of the impeller.

8. The magnetic mixer of claim 7, wherein the magnetic force enhancing member is formed of a high nickel alloy material and has a height and thickness corresponding to those of each of the permanent magnets.

9. A magnetic mixing system comprising:
    a liquid pouch formed of a flexible resin material;
    the magnetic mixer of claim 1, the magnetic mixer being installed through an opening formed in the liquid pouch; and
    a container configured to accommodates the liquid pouch while covering side surfaces and a bottom surface of the liquid pouch, the container being mounted to expose the magnetic mixer.

10. The magnetic mixing system of claim 9, wherein the container has a slit type opening formed to be long in a vertical direction to allow a water level of liquids contained in the liquid pouch to be observed.

11. The magnetic mixing system of claim 9, wherein at least one liquid injection hole is provided in an upper portion of the liquid pouch, and at least one liquid discharge hole is provided in a lower portion of the liquid pouch.

12. The magnetic mixing system of claim 9, wherein an outer end of a lower surface of the bonding part of the bonding plate is thermally fused around an inner circumferential surface of the opening in the liquid pouch.

13. The magnetic mixing system of claim 9, wherein the liquid pouch is formed of a multi-layer polyethylene (PE) film, the bonding plate is formed of a high-density polyethylene (HDPE) material, and thermal fusion temperature is in a range of 170° C. to 200° C.

* * * * *